United States Patent
Inui et al.

(10) Patent No.: US 10,377,838 B2
(45) Date of Patent: Aug. 13, 2019

(54) RESIN COMPOSITE MATERIAL AND METHOD FOR PRODUCING RESIN COMPOSITE MATERIAL

(75) Inventors: Nobuhiko Inui, Osaka (JP); Daisuke Mukohata, Osaka (JP); Mitsuru Naruta, Osaka (JP); Kensuke Tsumura, Osaka (JP); Kazuhiro Sawa, Osaka (JP); Katsunori Takahashi, Osaka (JP); Koji Taniguchi, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 694 days.

(21) Appl. No.: 13/818,981

(22) PCT Filed: Sep. 2, 2011

(86) PCT No.: PCT/JP2011/070028
§ 371 (c)(1),
(2), (4) Date: Apr. 9, 2013

(87) PCT Pub. No.: WO2012/029946
PCT Pub. Date: Mar. 8, 2012

(65) Prior Publication Data
US 2013/0210955 A1    Aug. 15, 2013

(30) Foreign Application Priority Data

Sep. 3, 2010  (JP) .................................. 2010-198039
Dec. 9, 2010  (JP) .................................. 2010-274979
Dec. 9, 2010  (JP) .................................. 2010-274995

(51) Int. Cl.
C08L 101/00    (2006.01)
C08J 3/28      (2006.01)
(Continued)

(52) U.S. Cl.
CPC .............. *C08F 10/02* (2013.01); *B82Y 30/00* (2013.01); *C08F 10/06* (2013.01); *C08F 12/08* (2013.01);
(Continued)

(58) Field of Classification Search
CPC .......... C08F 10/02; C08F 10/06; C08F 12/08; B82Y 30/00; C08K 9/04; C08K 7/24;
(Continued)

(56) References Cited

U.S. PATENT DOCUMENTS

2008/0293853 A1   11/2008   Wolf et al.
2009/0123731 A1    5/2009   Shimizu et al.
(Continued)

FOREIGN PATENT DOCUMENTS

CN    101775241 A    7/2010
CN    101812194 A    8/2010
(Continued)

OTHER PUBLICATIONS

Supplementary European Search Report for the Application No. EP 11 82 1960 dated Dec. 5, 2013.
(Continued)

*Primary Examiner* — Jessica M Roswell
(74) *Attorney, Agent, or Firm* — Cheng Law Group, PLLC

(57) ABSTRACT

Provided is a resin composite material in which a carbon material with a graphene structure is dispersed in a synthetic resin and which has a high mechanical strength and a low linear expansion coefficient and a method for producing the resin composite material. A resin composite material contains a synthetic resin and a carbon material with a graphene structure dispersed in the synthetic resin, wherein the synthetic resin is grafted onto the carbon material and the grafting ratio thereof onto the carbon material is 5% to
(Continued)

3300% by weight. A method for producing a resin composite material includes the steps of: preparing a resin composite containing a synthetic resin and a carbon material with a graphene structure dispersed in the synthetic resin; and grafting the synthetic resin onto the carbon material concurrently with or after the step of preparing the resin composite.

8 Claims, 2 Drawing Sheets

(51) Int. Cl.
| | |
|---|---|
| C08K 7/00 | (2006.01) |
| C08F 10/02 | (2006.01) |
| C08K 3/04 | (2006.01) |
| C08K 7/24 | (2006.01) |
| C08F 10/06 | (2006.01) |
| C08F 12/08 | (2006.01) |
| C08L 23/26 | (2006.01) |
| C08L 25/06 | (2006.01) |
| C08J 5/00 | (2006.01) |
| C08K 9/04 | (2006.01) |
| B82Y 30/00 | (2011.01) |
| C08L 51/10 | (2006.01) |
| C09C 1/46 | (2006.01) |

(52) U.S. Cl.
CPC ............... *C08J 5/005* (2013.01); *C08K 3/04* (2013.01); *C08K 7/24* (2013.01); *C08K 9/04* (2013.01); *C08L 23/26* (2013.01); *C08L 25/06* (2013.01); *C01P 2002/82* (2013.01); *C01P 2002/88* (2013.01); *C01P 2004/20* (2013.01); *C01P 2006/12* (2013.01); *C08J 2323/02* (2013.01); *C08L 51/10* (2013.01); *C09C 1/46* (2013.01)

(58) Field of Classification Search
CPC ....... C08J 5/005; C08J 2323/02; C08L 25/06; C08L 23/26; C08L 51/10; C09C 1/46; C01P 2002/82; C01P 2006/12; C01P 2004/20; C01P 2002/88
See application file for complete search history.

(56) References Cited

U.S. PATENT DOCUMENTS

| | | |
|---|---|---|
| 2009/0306276 A1 | 12/2009 | Magnet et al. |
| 2011/0124793 A1 | 5/2011 | Shimizu et al. |
| 2012/0107593 A1 | 5/2012 | Luo et al. |

FOREIGN PATENT DOCUMENTS

| | | | | |
|---|---|---|---|---|
| EP | 1777259 | * | 4/2007 | ............... C08K 9/08 |
| JP | 2004-183127 A | | 7/2004 | |
| JP | 2005-264059 A | | 9/2005 | |
| JP | 2008-184590 A | | 8/2008 | |
| JP | 2008-239747 A | | 10/2008 | |
| JP | 2008-266577 A | | 11/2008 | |
| JP | 2009-537648 A | | 10/2009 | |
| JP | 2009-545639 A | | 12/2009 | |
| JP | 2010-174161 A | | 8/2010 | |
| WO | WO 2007/135323 A2 | | 11/2007 | |
| WO | WO-2008/014894 A1 | | 2/2008 | |
| WO | WO-2010/074918 A1 | | 7/2010 | |

OTHER PUBLICATIONS

Written Opinion of the International Searching Authority (PCT/ISA/237) for the Application No. PCT/JP2011/070028 dated Oct. 25, 2011 (English Translation mailed Apr. 18, 2013).
International Search Report for the Application No. PCT/JP2011/070028 dated Oct. 25, 2011.
Written Opinion of the International Searching Authority (PCT/ISA/237)for the Application No. PCT/JP2011/070028 dated Oct. 25, 2011.
Notification of Reasons for Refusal for the Application No. 2012-090086 from Japan Patent Office dated Dec. 16. 2014.
European Office Action for the Application No. 11 821 960.9 dated Dec. 12, 2016.
European Office Action for Application No. EP 11 821 960.9 dated Apr. 19, 2017.
Fang, Ming et al., Covalent polymer functionalization of graphene nanosheets and mechanical properties of composites°, Journal of Materials Chemistry, 2009, vol. 19, No. 38, pp. 7098-7105.
Kuilla, Tapas et al., "Recent advances in graphene based polymer composites", Progress in Polymer Science, 2010, vol. 35, No. 11, pp. 1350-1375.
Office Action for the Application No. 1638/CHENP/2013 from the Intellectual Property India Office dated Jul. 20, 2018.

* cited by examiner

[FIG. 1]
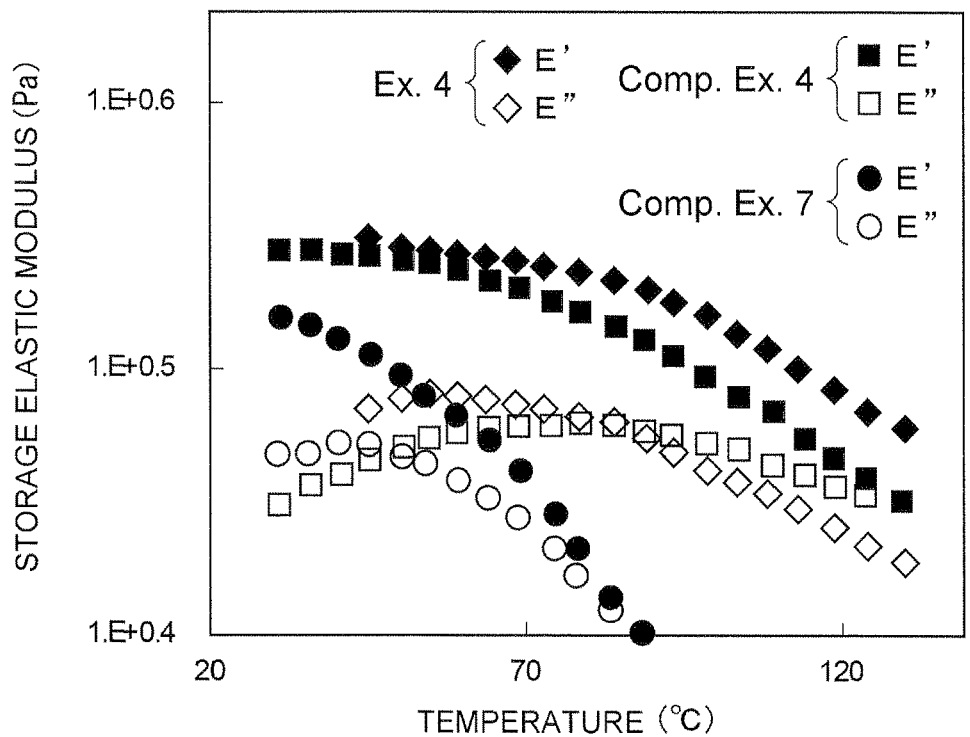
[FIG. 2]
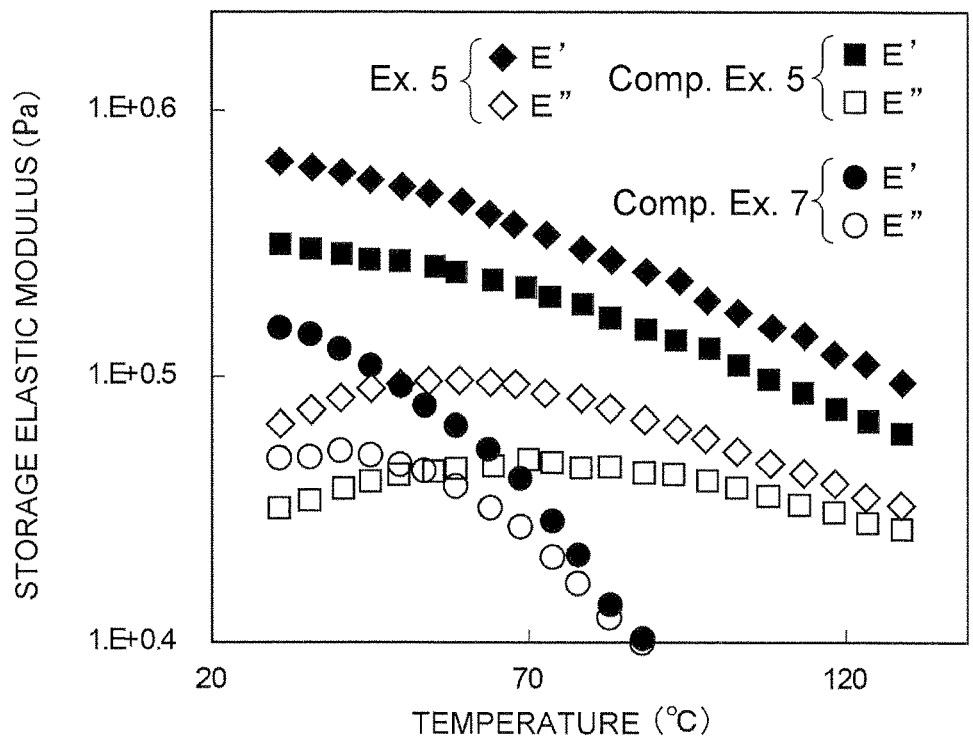

[FIG. 3]
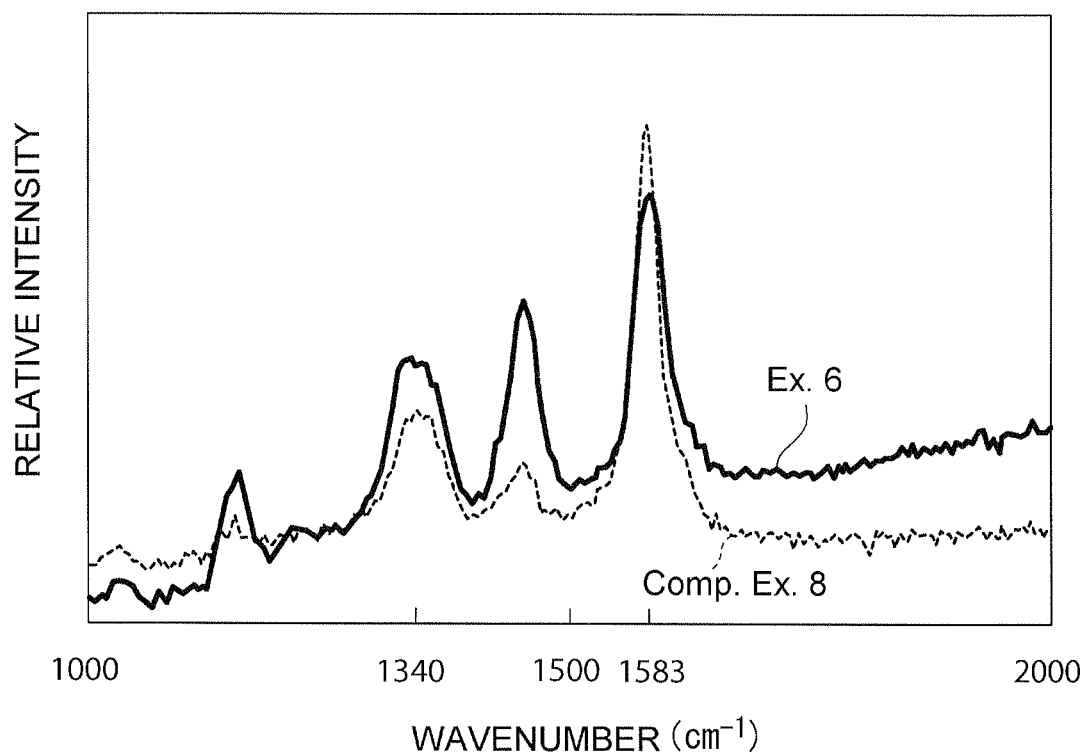

US 10,377,838 B2

RESIN COMPOSITE MATERIAL AND METHOD FOR PRODUCING RESIN COMPOSITE MATERIAL

TECHNICAL FIELD

The present invention relates to a method for producing a resin composite material in which a carbon material is dispersed in a synthetic resin and the resin composite material and particularly relates to the method for producing a resin composite material in which the carbon material is a carbon material with a graphene structure and the resin composite material.

BACKGROUND ART

Attention is being focused on carbon materials with a graphene structure because they have high Young's modulus and high electrical conductivity. Compounding such a carbon material with a graphene structure into a synthetic resin enables reinforcement of a product made of the synthetic resin and impartment of electrical conductivity to the product. In particular, a graphene sheet, a carbon nanotube, flaked-graphite or the like has a nanoscale size and a large specific surface area. Therefore, such a carbon material is believed to exhibit a high reinforcing effect when it is compounded into resin.

Generally, in order that the resultant compound is more effective as a composite material, it is preferred that the carbon material be uniformly dispersed in the matrix resin. Patent Literature 1 below discloses a method in which a good solvent for a thermoplastic resin and a carbon material is used to obtain a uniform dispersion state. This method provides a resin composite material having a uniform dispersion state, provided a common solvent for the thermoplastic resin and the carbon material.

CITATION LIST

Patent Literature

Patent Literature 1: JP A-2005-264059

SUMMARY OF INVENTION

Technical Problem

However, in the resin composite material described in Patent Literature 1, the interface between the thermoplastic resin and the carbon material formed after volatilization of the solvent has low adhesion strength. Therefore, when an external force is applied to the obtained resin composite material, peeling may occur at the interface. In addition, such a carbon material as above has a large cohesion force derived from a π-stacking force and, therefore, exhibits extremely poor dispersibility in the solvent. Hence, the resin composite material presents a problem in that it does not develop sufficient mechanical strength.

An object of the present invention is to provide the resin composite material in which a carbon material with a graphene structure is dispersed in the resin and which has a high mechanical strength and a low linear expansion coefficient and also provide a method for producing the resin composite material.

Solution to Problem

A resin composite material of the present invention is a resin composite material containing a synthetic resin and a carbon material with a graphene structure, the carbon material being dispersed in the synthetic resin, wherein the synthetic resin is grafted onto the carbon material and the grafting ratio thereof onto the carbon material is 5% to 3300% by weight.

In a particular aspect of the resin composite material of the present invention, the resin composite material further contains a resin of a different type from the synthetic resin. In such a case, various resin composite materials having different physical properties can be easily provided.

In another particular aspect of the resin composite material of the present invention, the carbon material with a graphene structure is flaked-graphite or carbon nanotubes. In this case, the carbon material has a nanoscale size and a large specific surface area. Therefore, the resin composite material can be further increased in mechanical strength and further decreased in linear expansion coefficient.

In still another particular aspect of the resin composite material of the present invention, the synthetic resin is a thermoplastic resin. In this case, the resin composite material can be easily formed, so that resin composite material articles having various shapes can be easily provided. More preferably, a polyolefin is used as the thermoplastic resin. In this case, the use of polyolefin widely used provides cost reduction of the resin composite material.

In still another particular aspect of the resin composite material of the present invention, the thermoplastic resin is an amorphous resin. In this case, the carbon material is uniformly dispersed in the amorphous resin, so that the mobility of the amorphous resin can be effectively reduced. Therefore, the resin composite material can be effectively increased in mechanical strength and effectively decreased in linear expansion coefficient.

A method for producing a resin composite material of the present invention includes the steps of: preparing a resin composite containing a synthetic resin and a carbon material with a graphene structure, the carbon material being dispersed in the synthetic resin; and grafting the synthetic resin onto the carbon material concurrently with or after the step of preparing the resin composite.

In a particular aspect of the method for producing a resin composite material of the present invention, the step of grafting resins is implemented by irradiating the resin composite with an electron beam. In this case, by irradiating the resin composite with an electron beam, free radicals can be generated within the synthetic resin. Thus, the synthetic resin having free radicals can be grafted onto the carbon material.

In another particular aspect of the method for producing a resin composite material of the present invention, the step of grafting resins is implemented by mixing a radical initiator into the synthetic resin and the carbon material. In this case, by mixing the radical initiator into the synthetic resin and the carbon material, free radicals can be generated within the synthetic resin. Thus, the synthetic resin having free radicals can be grafted onto the carbon material.

In still another particular aspect of the method for producing a resin composite material of the present invention, the step of grafting resins is implemented by hot kneading the synthetic resin and the carbon material with a shear kneader with a kneading screw. In addition, during the hot kneading, the screw is rotated at a rotational speed of 500 to 5000 rpm. In this case, in the course of hot kneading the carbon material with a graphene structure, molecular chains of the synthetic resin are broken, so that free radicals are generated within the synthetic resin. Thus, the synthetic resin having free radicals can be grafted onto the carbon material.

Preferably, the hot kneading is implemented by dynamic hot kneading. In this case, the affinity between the carbon material and the synthetic resin is further increased, so that the carbon material can be easily and uniformly dispersed into the synthetic resin.

In still another particular aspect of the method for producing a resin composite material of the present invention, the step of grafting resins is implemented by irradiating the resin composite with microwaves. By irradiating the resin composite with microwaves, free radicals can be generated within the synthetic resin. Thus, the synthetic resin having free radicals can be grafted onto the carbon material.

In the grafting by microwave irradiation as described above, the process of generating free radicals is simple. In addition, molecules of the synthetic resin are cut off only at the interface with the carbon material, which avoids molecules of the synthetic resin from being excessively cut off. Therefore, the resultant resin composite material can be efficiently increased in mechanical strength and efficiently decreased in linear expansion coefficient.

In still another particular aspect of the method for producing a resin composite material of the present invention, in the step of grafting resins, the synthetic resin is grafted onto the carbon material so that the grafting ratio thereof onto the carbon material is within a range of 5% to 3300% by weight. In this case, the adhesion between the synthetic resin and the carbon material can be further increased. Therefore, the carbon material can be more uniformly dispersed into the synthetic resin. Thus, a resin composite material can be obtained which has a further increased mechanical strength and a further decreased linear expansion coefficient.

In still another particular aspect of the method for producing a resin composite material of the present invention, the method further including a separation step of, after the step of grafting resins, separating the carbon material having the synthetic resin grafted thereonto from the resin composite and the step of, after the separation step, mixing a fresh synthetic resin of the same type as or a different type from the synthetic resin with the carbon material having the synthetic resin grafted thereonto. In this case, by mixing the fresh synthetic resin, various resin composite materials having different physical properties can be easily produced.

In still another particular aspect of the method for producing a resin composite material of the present invention, the method further including the step of, after the step of grafting resins, mixing a resin of the same type as or a different type from the synthetic resin. In this case, various resin composite materials having different physical properties can be easily produced.

In still another particular aspect of the method for producing a resin composite material of the present invention, the carbon material with a graphene structure is flaked-graphite or carbon nanotubes. In this case, the carbon material has a nanoscale size and a large specific surface area. Therefore, a resin composite material further increased in mechanical strength can be easily produced.

In still another particular aspect of the method for producing a resin composite material of the present invention, the synthetic resin is a thermoplastic resin. In this case, the resin composite material can be easily formed, so that resin composite material articles having various shapes can be easily produced. More preferably, a polyolefin is used as the thermoplastic resin. In this case, the use of polyolefin widely used provides reduction in production cost of the resin composite material.

In still another particular aspect of the method for producing a resin composite material of the present invention, the thermoplastic resin is an amorphous resin. In this case, the carbon material is uniformly dispersed in the amorphous resin, so that the fluidity of the amorphous resin can be effectively reduced. Therefore, a resin composite material can be obtained which has an effectively increased mechanical strength and an effectively decreased linear expansion coefficient.

Advantageous Effects of Invention

In the resin composite material according to the present invention, a synthetic resin is grafted onto a carbon material with a graphene structure and the grafting ratio thereof onto the carbon material is 5% to 3300% by weight. Therefore, the adhesion between the carbon material and the synthetic resin is increased within the resin composite material. In addition, the carbon material having the synthetic resin grafted thereonto is increased in affinity for the synthetic resin and, therefore, uniformly dispersed in the synthetic resin. Thus, the carbon material is uniformly dispersed in the synthetic resin. Hence, a resin composite material can be produced which has an increased mechanical strength and a decreased linear expansion coefficient.

Furthermore, in the method for producing a resin composite material according to the present invention, since a synthetic resin is grafted onto a carbon material with a graphene structure, a chemical bond is formed between the carbon material and the synthetic resin. Thus, the adhesion between the carbon material and the synthetic resin is increased. In addition, the carbon material having the synthetic resin grafted thereonto is increased in affinity for the synthetic resin, so that the carbon material can be uniformly dispersed in the synthetic resin. Hence, a resin composite material can be obtained which has an increased mechanical strength and a decreased linear expansion coefficient.

Moreover, in the method for producing a resin composite material according to the present invention, since a carbon material with a graphene structure is used, free radicals generated during grafting of the synthetic resin are delocalized by the graphene structure of the carbon material. Therefore, a selective reaction progresses between the carbon material and the synthetic resin. Thus, the synthetic resin can be efficiently grafted onto the carbon material. Hence, in the production method of the present invention, a resin composite material can be efficiently obtained which has an increased mechanical strength and a decreased linear expansion coefficient.

BRIEF DESCRIPTION OF DRAWINGS

FIG. 1 is a graph showing, in viscoelasticity measurement of resin composite material sheets obtained in Example 4 and Comparative Examples 4 and 7, the temperature, the storage elastic modulus (E'), and the loss elastic modulus (E") of each resin composite material sheet.

FIG. 2 is a graph showing, in viscoelasticity measurement of resin composite material sheets obtained in Example 5 and Comparative Examples 5 and 7, the temperature, the storage elastic modulus (E'), and the loss elastic modulus (E") of each resin composite material sheet.

FIG. 3 is a graph showing Raman spectra from Raman microscopic measurement of resin composite material sheets obtained in Example 6 and Comparative Example 8.

DESCRIPTION OF EMBODIMENTS

A description will hereinafter be given of the details of the present invention.

<Resin Composite Material>

A resin composite material of the present invention contains a synthetic resin and a carbon material having a graphene structure and dispersed in the synthetic resin. In the resin composite material of the present invention, the synthetic resin is grafted onto the carbon material and the grafting ratio thereof onto the carbon material is 5% to 3300% by weight.

(Synthetic Resin)

No particular limitation is placed on the type of the synthetic resin contained in the resin composite material of the present invention and various known synthetic resins can be used. Preferably, a thermoplastic resin is used as the synthetic resin. In the case of the resin composite material in which a thermoplastic resin is used, various formed parts can be easily obtained using various forming methods under application of heat. Examples of the thermoplastic resin include polyolefins, as typified by polyethylenes including high-density polyethylenes, low-density polyethylenes, and linear low-density polyethylenes and polypropylenes including homopolypropylenes, block polypropylenes, and random polypropylenes; cyclic polyolefins, such as norbornene resins; vinyl acetate copolymers, such as polyvinyl acetate and ethylene-vinyl acetate; polyvinyl acetate derivatives, such as polyvinyl alcohol and polyvinyl butyral; polyesters, such as PET, polycarbonates, and polyactates; polyether resins, such as polyethylene oxide, polyphenylene ethers, and polyether ether ketones; acrylic resins, such as PMMA; sulfone resins, such as polysulfones and polyether sulfones; fluorinated resins, such as PTFE and PVDF; polyamide resins, such as nylons; halogenated resins, such as vinylidene chloride; polystyrenes; polyacrylonitriles; and their copolymer resins. The above synthetic resins may be used alone or in combination of two or more. Polyolefins are particularly preferably used because they are inexpensive and easily formable under application of heat.

Alternatively, a crystalline resin or an amorphous resin may be used as the synthetic resin. In the case of using an amorphous resin as the synthetic resin, the fluidity of the amorphous resin can be effectively reduced by dispersing the carbon material into the amorphous resin. No particular limitation is placed on the type of the amorphous resin and any appropriate amorphous resin can be used. Examples of the amorphous resin include atactic polypropylenes, amorphous norbornene, amorphous PET, amorphous polycarbonates, polyphenylene ethers, polyether ether ketones, atactic PMMA, polysulfones, polyether sulfones, and atactic polystyrenes. Atactic polypropylenes, which are inexpensive, can be more preferably used.

(Carbon Material with Graphene Structure)

In the resin composite material of the present invention, the carbon material with a graphene structure is dispersed in the synthetic resin. Thus, the resin composite material of the present invention can be increased in mechanical strength and decreased in linear expansion coefficient. In addition, in some cases, the resin composite material of the present invention can develop electrical conductivity. Therefore, the resin composite material of the present invention has the potential for use also as a material developing electrical conductivity.

In addition, the synthetic resin is grafted onto the carbon material. Therefore, in the resin composite material of the present invention, the adhesion between the synthetic resin and the carbon material is further increased. Furthermore, the carbon material having the synthetic resin grafted thereonto is increased in affinity for the synthetic resin. Therefore, in the resin composite material of the present invention, the resin-grafted carbon material is uniformly dispersed within the synthetic resin. Thus, the resin composite material of the present invention can be effectively increased in mechanical strength and effectively decreased in linear expansion coefficient.

Although no particular limitation is placed on the type of the carbon material with a graphene structure, flaked-graphite or carbon nanotubes can be preferably used. More preferably, a stack of a plurality of graphene sheets, i.e., flaked-graphite, can be used as the carbon material. In the present invention, flaked-graphite is obtained by flaking original graphite and refers to a graphene sheet stack thinner than the original graphite. The number of layers of graphene sheets stacked in the flaked-graphite may be sufficient if it is smaller than that in the original graphite, but normally about a few to about 200 layers.

The flaked-graphite has a shape having a relatively large specific surface area. Since in the resin composite material of the present invention the flaked-graphite is dispersed therein, the resin composite material can be effectively increased in mechanical strength against an external force applied in a direction orthogonal to the graphene sheet stack plane of the flaked-graphite. The specific surface area herein refers to a BET specific surface area measured by a three-point BET method.

The preferred lower limit of the BET specific surface area of the flaked-graphite is 15 $m^2/g$ and the preferred upper limit thereof is 2700 $m^2/g$. If the specific surface area of the flaked-graphite is smaller than 15 $m^2/g$, this may not sufficiently increase the mechanical strength against an external force applied in the direction orthogonal to the stack plane. On the other hand, the theoretical BET specific surface area of a single-layer graphene sheet is 2700 $m^2/g$, which is a limit value.

Although no particular limitation is placed on the compounding ratio between the carbon material and the synthetic resin, the amount of carbon material compounded is preferably within the range of 1 to 50 parts by weight relative to 100 parts by weight of the synthetic resin. If the amount of carbon material compounded is below 1 part by weight, the mechanical strength may not sufficiently be increased and the linear expansion coefficient may not sufficiently be decreased. If the amount of carbon material compounded is above 50 parts by weight, the resin composite material is increased in stiffness but may be brittle and likely to be broken.

In the resin composite material of the present invention, the grafting ratio onto the carbon material is within the range of 5% to 3300% by weight. The grafting ratio onto the carbon material here refers to the ratio of the weight of synthetic resin directly forming a chemical bond with carbon material in the resin composite material by grafting thereonto to the weight of carbon material contained in the resin composite material. When the grafting ratio onto the carbon material is within the above range, the resin composite material of the present invention can be effectively increased in mechanical strength and effectively decreased in linear expansion coefficient.

If the grafting ratio onto the carbon material is lower than 5% by weight, the adhesion between the synthetic resin and the carbon material may not sufficiently be increased. Therefore, the resin composite material may not be able to be sufficiently increased in mechanical strength and sufficiently decreased in linear expansion coefficient. If the grafting ratio onto the carbon material is higher than 3300% by weight, the effects may be saturated, so that the mechanical strength may not sufficiently be increased and the linear expansion coefficient may not sufficiently be decreased. The grafting ratio onto the carbon material is preferably within the range of 10% to 2000% by weight and more preferably within the range of 30% to 1000% by weight.

The grafting ratio onto carbon material contained in the resin composite material can be determined in the following manner. For example, an ungrafted portion of the synthetic resin contained in the resin composite material is dissolved away by a solvent to isolate the resin-grafted carbon material. Thereafter, the resin-grafted carbon material is subjected to a thermogravimetric measurement (TGA measurement) within the temperature range of 30° C. to 600° C. at a rate of temperature increase of 10° C./min in an air atmosphere. Now, supposing that the amount of matter decomposed before the temperature is increased to 500° C. is represented as A % by weight and the amount of undecomposed residue not yet decomposed even when the temperature is increased to 500° C. is represented as B % by weight, the grafting ratio onto the carbon material can be determined from the following equation.

Grafting ratio (% by weight)=$A/B$×100

No particular limitation is placed on the solvent used so long as it can dissolve the ungrafted portion of the synthetic resin and hardly dissolves the resin-grafted carbon material, and any appropriate solvent can be used. For example, when the synthetic resin is an olefin resin, hot xylene at 130° C. can be used. When the synthetic resin is an acrylic resin, such as PMMA, acetone or dichlorobenzene can be used. When the synthetic resin is a polyamide resin, such as nylons, hot benzyl alcohol at 200° C. or hot nitrobenzene at 200° C. can be used. When the synthetic resin is a polystyrene resin, THF or dichlorobenzene can be used. When the synthetic resin is a polycarbonate resin, THF or dichloromethane can be used.

(Additional Resin)

The resin composite material of the present invention may further contain an additional resin of a different type from the synthetic resin. In this case, since the resin composite material contains the above additional resin, various resin composite materials having different physical properties can be easily provided. The additional resin may be grafted or not grafted onto the carbon material.

No particular limitation is placed on the type of the additional resin and various thermoplastic resins and thermosetting resins can be used. Examples of the thermoplastic resin include the various foregoing thermoplastic resins that can be used as the synthetic resin. Examples of the thermosetting resin include epoxy resins and polyurethane resins. The additional resin may be a crystalline resin or such an amorphous resin as described previously. Nevertheless, the additional resin is preferably a crystalline resin because crystalline resins are generally excellent in mechanical properties including an elastic modulus and in forming processability as compared with amorphous resins.

Although no particular limitation is placed on the compounding ratio between the synthetic resin and the additional resin, the amount of additional resin compounded is preferably not more than 1000 parts by weight relative to 100 parts by weight of the synthetic resin. If the amount of additional resin compounded is above 1000 parts by weight, the carbon material contained in the resin composite material may not sufficiently exert the effect of increasing the mechanical strength and the effect of decreasing the linear expansion coefficient.

(Other Components)

The resin composite material of the present invention may contain various additives without disturbing the object of the present invention. Examples of such an additive include a phenolic, phosphorous, amine or sulfuric antioxidant; a metal inhibitor; a halogenated flame retardant, such as hexabromodiphenyl ether or decabromodiphenyl ether; a flame retardant, such as ammonium polyphosphate or trimethyl phosphate; various fillers; an antistat; a stabilizer; and a pigment.

The resin composite material of the present invention may contain any appropriate reaction aid commonly used to promote a radical reaction. Such a reaction aid may be used in order to, in producing the resin composite material of the present invention, promote a grafting reaction of the synthetic resin onto the carbon material. Examples of the reaction aid include divinylbenzene, trimethylolpropane trimethacrylate, 1,9-nonanediol dimethacrylate, 1,10-decanediol dimethacrylate, trimellitic acid triallyl esters, triallyl isocyanurate, ethylvinyl benzene, neopentyl glycol dimethacrylate, 1,6-hexanediol dimethacrylate, lauryl methacrylate, stearyl methacrylate, diallyl phthalate, diallyl terephthalate, and diallyl isophthalate.

<Production Method of Resin Composite Material>

A description is next given of a method for producing a resin composite material of the present invention.

First carried out is the step of preparing a resin composite containing a synthetic resin and a carbon material with a graphene structure dispersed in the synthetic resin.

The types of the synthetic resin and the carbon material with a graphene structure which can be used are those previously mentioned in the description of the resin composite material of the present invention. But actually, in the method for producing a resin composite material of the present invention, free radicals are generated in the synthetic resin in a later-described step of grafting the synthetic resin onto the carbon material. Thus, the synthetic resin having free radicals is grafted onto the carbon material. Therefore, synthetic resins likely to generate free radicals are preferred as the synthetic resin and polyolefins are particularly preferred.

An example of the method for preparing a resin composite is a method of mixing a synthetic resin and a carbon material with a graphene structure to disperse the carbon material into the synthetic resin. Although no particular limitation is placed on the mixing method, examples include a method of melt-kneading the synthetic resin and the carbon material and a method of dissolving or dispersing the synthetic resin and the carbon material into a solvent.

If the mixing method is the method of melt-kneading the synthetic resin and the carbon material, the melt-kneading can be done using any appropriate kneader, such as a Plastomill, uniaxial extruder, biaxial extruder, Banbury mixer or roll.

If the mixing method is the method of dissolving or dispersing the synthetic resin and the carbon material into a solvent, no particular limitation is placed on the type of the solvent so long as it can dissolve or disperse the synthetic resin and the carbon material. Examples of the solvent include dichlorobenzene, N-methyl-2-pyrrolidone, DMF, and higher alcohols.

Although no particular limitation is placed on the compounding ratio between the carbon material and the synthetic resin in the resin composite, the amount of carbon material compounded is preferably within the range of 1 to 50 parts by weight relative to 100 parts by weight of the synthetic resin. If the amount of carbon material compounded is below 1 part by weight, the mechanical strength may not sufficiently be increased and the linear expansion coefficient may not sufficiently be decreased. If the amount of carbon material compounded is above 50 parts by weight, the resin composite material is increased in stiffness but may be brittle and likely to be broken.

The resin composite, if needed, may further contain any one of the foregoing appropriate reaction aids commonly used to promote a radical reaction. By the addition of the reaction aid, the grafting reaction can be efficiently caused in the later-described step of grafting the synthetic resin onto the carbon material. In addition, a problem associated with the grafting reaction, i.e., resin degradation due to excessive breakage of the molecular chains, can be reduced.

The preferred reaction aids that can be used are polyfunctional compounds. The above reaction aids may be used alone or in combination of two or more.

If the amount of reaction aid added is small, the free radicals may not sufficiently be generated, so that the chemical bond between the synthetic resin and the carbon material may not sufficiently be formed. Therefore, the reaction aid is preferably compounded in an amount of at least 0.1 parts by weight, more preferably in an amount of at least 0.2 parts by weight, relative to 100 parts by weight of the synthetic resin.

If the amount of reaction aid added is too large, a large amount of polymerization product of the reaction aid may be produced, so that the resultant resin composite material may be degraded in appearance. Therefore, the reaction aid is preferably compounded in an amount of at most 10 parts by weight, more preferably in an amount of at most 8 parts by weight, relative to 100 parts by weight of the synthetic resin.

Furthermore, the resin composite may contain the foregoing various additives. Thus, the resultant resin composite material can be given various properties.

Examples of the method for preparing the resin composite containing the reaction aid and/or the additive include the mixing methods as described previously, such as the melt-kneading method and the method of dissolving or dispersing them into a solvent. The reaction aid and/or the additive may be added when the carbon material and the synthetic resin are mixed or at any other time.

Next, concurrently with or after the step of preparing the resin composite, the step of grafting resins the synthetic resin onto the carbon material is carried out. In this step, free radicals are generated in the synthetic resin by any appropriate method commonly used for the purpose of generating radicals in a synthetic resin. In this relation, carbon materials with a graphene structure have a property to easily attract free radicals by delocalizing the free radicals. Therefore, the free radicals are attracted to the carbon material, so that the carbon material and the synthetic resin are firmly bonded to each other by a radical grafting reaction. Thus, produced in the resin mixture is a carbon material onto the surface of which the synthetic resin is grafted.

In the above step, the grafting of the synthetic resin onto the carbon material is preferably done so that the grafting ratio thereof onto the carbon material is within the range of 5% to 3300% by weight. The grafting ratio onto the carbon material here refers to the ratio of the weight of synthetic resin directly forming a chemical bond with carbon material in the resin composite material by grafting thereonto to the weight of carbon material contained in the resin composite material. When the grafting ratio onto the carbon material is within the above range, the resin composite material obtained by the production method of the present invention can be effectively increased in mechanical strength and effectively decreased in linear expansion coefficient.

If the grafting ratio onto the carbon material is lower than 5% by weight, the adhesion between the synthetic resin and the carbon material may not sufficiently be increased. Therefore, the obtained resin composite material may not be able to be sufficiently increased in mechanical strength and sufficiently decreased in linear expansion coefficient. If the grafting ratio onto the carbon material is higher than 3300% by weight, the effects may be saturated, so that the mechanical strength may not sufficiently be increased and the linear expansion coefficient may not sufficiently be decreased. The grafting ratio onto the carbon material is preferably within the range of 10% to 2000% by weight and more preferably within the range of 30% to 1000% by weight.

An example of the method for grafting the synthetic resin onto the carbon material is a method of irradiating the resin composite with an electron beam. By irradiating the resin composite with an electron beam, free radicals can be generated within the synthetic resin. By the free radicals, the synthetic resin can be grafted onto the carbon material.

No particular limitation is placed on the type of the electron beam so long as it is of type commonly used for the purpose of generating radicals. For example, ionizing radiation, such as α-rays, β-rays, and γ-rays, and various other electron beams can be used. No particular limitation is placed on the electron beam irradiation method and the method can be implemented by using any known electron beam irradiator.

Although no particular limitation is placed on the amount of electron beam irradiated, it is preferably within the range of 0.01 to 10 Mrad. If the amount of electron beam irradiated is below 0.01 Mrad, the free radicals may not sufficiently be generated, so that the chemical bond between the synthetic resin and the carbon material may not sufficiently be formed. If the amount of electron beam irradiated is above 10 Mrad, molecules of the synthetic resin may be excessively cut off. Thus, the obtained resin composite material may be decreased in mechanical strength. More preferably, the amount of electron beam irradiated is within the range of 0.02 to 5 Mrad.

Another example of the method for grafting the synthetic resin onto the carbon material is a method of additionally mixing a radical initiator. By mixing the radical initiator, free radicals can be generated within the synthetic resin. By the free radicals, the synthetic resin can be grafted onto the carbon material.

In the mixing of the radical initiator, the radical initiator may be added concurrently with the step of preparing a resin composite, such as, for example, when the synthetic resin and the carbon material are mixed. Alternatively, the radical initiator may be mixed with the resin composite after the step of preparing the resin composite. The mixing method can be implemented by any appropriate method, such as melt-kneading or dissolution or dispersion into a solvent, like the foregoing mixing method.

The radical initiator that can be used is any appropriate initiator commonly used to generate radicals. Examples of such a radical initiator include peroxides, such as benzoyl peroxide and dicumyl peroxide, peroxide compounds, azo compounds, and dihalogen compounds. The above radical initiators may be used alone or in combination of two or more.

Although no particular limitation is placed on the compounding ratio of the radical initiator, it is preferably at least 0.1 parts by weight relative to 100 parts by weight of the synthetic resin. If the compounding ratio of the radical initiator is below 0.1 parts by weight, the free radicals may not sufficiently be generated, resulting in failure to cause a sufficient grafting reaction. More preferably, the compounding ratio of the radical initiator is at least 0.5 parts by weight relative to 100 parts by weight of the synthetic resin.

The compounding ratio of the radical initiator is preferably at most 10 parts by weight relative to 100 parts by weight of the synthetic resin. If the compounding ratio of the radical initiator is above 10 parts by weight, molecules of the synthetic resin may be excessively cut off. Thus, the obtained resin composite material may be decreased in mechanical strength. In addition, the danger of explosion and so on due to exotherm upon reaction may be increased. More preferably, the compounding ratio of the radical initiator is at most 8 parts by weight relative to 100 parts by weight of the synthetic resin.

Still another example of the method for grafting the synthetic resin onto the carbon material is a method of kneading the synthetic resin and the carbon material with a high shear force in the step of preparing a resin composite. In this method, molecules of the synthetic resin are cut off by high-shear kneading. Thus, free radicals can be generated at the cut synthetic resin. By the free radicals, the synthetic resin can be grafted onto the carbon material.

The above high-shear kneading can be carried out using a high-shear kneader with a high-speed rotating screw. The rotational speed of the screw of the high-shear machine is preferably within the range of 500 to 5000 rpm. If the rotational speed is below 500 rpm, the free radicals may not sufficiently be generated, so that the chemical bond between the amorphous synthetic resin and the carbon material may not sufficiently be formed. If the rotational speed is above 5000 rpm, molecules of the amorphous synthetic resin may be excessively cut off. Thus, the obtained resin composite material may be decreased in mechanical strength.

Preferably, the high-shear kneading is implemented by dynamic hot kneading. Thus, the affinity between the carbon material and the synthetic resin is further increased. Therefore, the carbon material can be easily and uniformly dispersed into the synthetic resin.

Although no particular limitation is placed on the type of the high-shear machine, a biaxial extruder, which is excellent in rotational shear efficiency, is preferably used. Furthermore, in the shearing with the high-speed rotating screw of the high-shear kneader, the kneading time decreases in inverse proportion to the rotational speed of the screw. Therefore, preferred high-speed rotating screws used include an extruder having a large screw length securing a sufficient kneading time and an internal feedback screw which allows arbitrary setting of the kneading time by turning a sample reaching the front end of the screw back to the rear of the screw.

Still another example of the method for grafting the synthetic resin onto the carbon material is a method of irradiating the resin composite with microwaves. No particular limitation is placed on the microwave irradiation method and the method can be implemented by using any known microwave irradiator, such as a microwave oven.

Although it is not known exactly why the synthetic resin is grafted onto the carbon material by the above method, there is a possible reason below: The carbon material with a graphene structure has electrical conductivity. Therefore, when the resin composite containing the carbon material is irradiated with microwaves, electrons in the carbon material are excited to cause a potential difference inside the resin composite. Thus, the carbon material discharges and emits electrons inside the resin composite. The electrons emitted at this time can generate free radicals upon application to the synthetic resin, like an electron beam emitted from a massive accelerator. By the free radicals, the synthetic resin can be grafted onto the carbon material.

There is also another possible reason below: Electromagnetic induction derived from microwaves causes the carbon material to be heated to a very high temperature. Thus, molecules of the synthetic resin existing at the interface with the carbon material in the resin composite are cut off to generate free radicals. By the free radicals, the synthetic resin can be grafted onto the carbon material.

All that is needed for the above method is irradiation of microwaves, in which case the process of generating free radicals is simple. In addition, molecules of the synthetic resin are cut off only at the interface with the carbon material, which avoids molecules of the synthetic resin from being excessively cut off. Therefore, the obtained resin composite material can be efficiently increased in mechanical strength and efficiently decreased in linear expansion coefficient.

Although no particular limitation is placed on the irradiation power upon irradiation of microwaves, it is preferably within the range of 10 to 1000 W. If the irradiation power is below 10 W, the free radicals may not sufficiently be generated, so that the chemical bond between the amorphous synthetic resin and the carbon material may not sufficiently be formed. If the irradiation power is above 1000 W, molecules of the synthetic resin may be excessively cut off. Thus, the obtained resin composite material may be decreased in mechanical strength. More preferably, the irradiation power is within the range of 50 to 700 W.

By the step of grafting resins the synthetic resin onto the carbon material, the above resin composite can be obtained which contains the carbon material onto which portions of the synthetic resin are grafted and an unreacted portion of the synthetic resin not grafted onto the carbon material. The resin composite thus obtained can be provides as a resin composite material obtained by the production method of the present invention and including the unreacted portion of the synthetic resin as the matrix resin.

In the resin composite material, the synthetic resin is grafted onto the surface of the carbon material with a graphene structure. Therefore, in the resin composite material of the present invention, the adhesion between the synthetic resin and the carbon material is further increased. Furthermore, the resin-grafted carbon material is increased in affinity for the synthetic resin. Therefore, in the resin composite material including the synthetic resin, the resin-grafted carbon material is uniformly dispersed within the synthetic resin. Thus, the resin composite material can be effectively increased in mechanical strength and effectively decreased in linear expansion coefficient.

Alternatively, in the method for producing a resin composite material of the present invention, after the step of grafting resins, the carbon material having the synthetic resin grafted thereonto is separated from the resin composite containing the resin-grafted carbon material and a fresh synthetic resin is mixed with the separated, resin-grafted carbon material, so that a different resin composite material containing the fresh synthetic resin as the matrix resin can be obtained. By using the fresh synthetic resin as the matrix resin instead of the synthetic resin used in the step of grafting resins, various resin composite materials having different physical properties can be easily produced.

No particular limitation is placed on the method for separating the resin-grafted carbon material from the resin composite. An example of the separating method is a method of dissolving away an ungrafted portion of the synthetic resin contained in the resin composite by a solvent to isolate the resin-grafted carbon material. No particular limitation is placed on the solvent used so long as it can dissolve the ungrafted portion of the synthetic resin and hardly dissolves the resin-grafted carbon material, and any appropriate solvent can be used. For example, when the synthetic resin is an olefin resin, hot xylene at 130° C. can be used. When the synthetic resin is an acrylic resin, such as PMMA, acetone or dichlorobenzene can be used. When the synthetic resin is a polyamide resin, such as nylons, hot benzyl alcohol at 200° C. or hot nitrobenzene at 200° C. can be used. When the synthetic resin is a polystyrene resin, THF or dichlorobenzene can be used. When the synthetic resin is a polycarbonate resin, THF or dichloromethane can be used.

The resin-grafted carbon material is increased in affinity also within the fresh synthetic resin because the carbon material with a graphene structure is surface-modified by the synthetic resin. Therefore, also in the different resin composite material including the fresh synthetic resin as the matrix resin, the resin-grafted carbon material is uniformly dispersed within the fresh synthetic resin. Thus, the resin composite material can be effectively increased in mechanical strength and effectively decreased in linear expansion coefficient.

No particular limitation is placed on the type of the fresh synthetic resin and the foregoing various thermoplastic resins, thermosetting resins and so on can be used. Thermoplastic resins are preferably used as the fresh synthetic resin and polyolefins, which are inexpensive and excellent in moldability, are more preferably used. The fresh synthetic resin may be a crystalline resin or such an amorphous resin as described previously. Nevertheless, the additional resin is preferably a crystalline resin because crystalline resins are generally excellent in mechanical properties including an elastic modulus and in forming processability as compared with amorphous resins.

The fresh synthetic resin and the synthetic resin used in the step of grafting resins may be of the same type or of different types. Furthermore, the fresh synthetic resin used may be composed of a single type or a combination of two or more types.

The mixing of the resin-grafted carbon material with the fresh synthetic resin can be implemented by any appropriate method, such as melt-kneading or dissolution or dispersion into a solvent, like the foregoing method for mixing the carbon material and the synthetic resin.

Alternatively, in the method for producing a resin composite material of the present invention, after the step of grafting resins, the foregoing additional resin is further mixed into the resin composite containing the carbon material having the synthetic resin grafted thereonto, so that a different resin synthetic material containing as the matrix resin both the synthetic resin and the additional resin can be obtained. Thus, various resin composite materials having different physical properties can be easily produced.

The method for mixing the synthetic resin and the additional resin can be implemented by any appropriate method, such as melt-kneading or dissolution or dispersion into a solvent, like the foregoing method for mixing the carbon material and the synthetic resin.

The additional resin and the synthetic resin may be of the same type or of different types. Furthermore, the additional resin used may be composed of a single type or a combination of two or more types.

Although no particular limitation is placed on the compounding ratio between the resin composite containing the carbon material having the synthetic resin grafted thereonto and the additional resin, the amount of additional resin compounded is preferably not more than 1000 parts by weight relative to 100 parts by weight of the resin composite. If the amount of additional resin compounded is above 1000 parts by weight, the carbon material contained in the resin composite material may not sufficiently exert the effect of increasing the mechanical strength and the effect of decreasing the linear expansion coefficient.

For example, each of the resin composite material of the present invention and the resin composite material obtained by the production method of the present invention is pressed into a sheet, so that a resin composite material sheet can be produced which is high in mechanical strength, such as tensile elastic modulus or bending elastic modulus, and low in linear expansion coefficient. However, no particular limitation is placed on the product produced from each of the resin composite material of the present invention and the resin composite material obtained by the production method of the present invention. By using each of the resin composite material of the present invention and the resin composite material obtained by the production method of the present invention, various products can be produced which are high in mechanical strength and low in linear expansion coefficient.

If in the method for producing a resin composite material of the present invention the step of preparing a resin composite and the step of grafting resins are not concurrently carried out, the resin composite may be able to be formed into a shape prior to the grafting. For example, in the case that grafting is done by the foregoing irradiation of an electron beam or microwaves, the resin composite can be formed, such as by press forming, prior to the grafting and then grafted by irradiation of an electron beam or microwaves.

EXAMPLES AND COMPARATIVE EXAMPLES

The present invention will be demonstrated taking specific examples of the present invention and comparative examples. However, the present invention is not limited by the following examples.

The materials used in the examples of the present invention and the comparative examples are as follows.

(Flaked-Graphite A)

Flaked-graphite having a trade name "xGnP-5" and manufactured by XG Sciences, Inc. was used as Flaked-graphite A. This Flaked-graphite A was used in later-described Examples 1 to 3, 6, 13, and 16 to 22 and Comparative Examples 1 to 3, 8, 15, and 18 to 24.

When Flaked-graphite A was observed using a SEM before use, the maximum dimension of the layer surface in the in-plane direction was about 5.0 μm, the layer thickness was about 60 nm, the number of stacked graphene sheets was about 180, and the BET specific surface area was 75 $m^2/g$.

(Flaked-Graphite B)

Flaked-graphite B used in Example and Comparative Example was produced in the following manner.

An amount of 0.25 g of graphite single crystal powder was fed into 11.5 ml of 65% by weight concentrated sulfuric acid and the resultant mixture was stirred with cooling in a 10° C. water bath. Next, the mixture obtained by the stirring of the graphite single crystal powder and the concentrated sulfuric acid was stirred with gradually addition of 1.5 g of potassium permanganate to cause the mixture to react at 35° C. for 30 minutes.

Next, 23 g of water was gradually added to the reaction mixture to cause the mixture to react at 98° C. for 15 minutes. Thereafter, 70 g of water and 4.5 g of 30% by weight hydrogen peroxide water were added to the reaction mixture to stop the reaction. Subsequently, the mixture was centrifuged at a rotational speed of 14000 rpm for 30 minutes. Thereafter, the resultant graphite oxide was well washed in 5% by weight dilute hydrochloric acid and water and then dried. The resultant graphite oxide was dispersed in water at a concentration of 0.2 mg/ml and then irradiated with ultrasonic waves for 60 minutes using an ultrasonic bath under the conditions of 45 kHz and 100 W to break at the layer interface into flakes, resulting in flaked-graphite whose layer surface was oxidized. Hydrazine was added to the resultant flaked-graphite having the layer surface oxidized, and reduced for three minutes, resulting in a liquid mixture of Flaked-graphite B.

Thereafter, the resultant liquid mixture of Flaked-graphite B was filtered and the filtered Flaked-graphite B was dried to obtain Flaked-graphite B. The resultant Flaked-graphite B was used in later-described Example 7 and Comparative Example 9.

When Flaked-graphite B was observed using an AFM (atomic force microscope) before use, the maximum dimension of the layer surface in the in-plane direction was about 5.0 μm, the layer thickness was about 2 nm, the number of stacked graphene sheets was about six, and the BET specific surface area was 450 m/g.

(o-Dichlorobenzene Solution of Flaked-Graphite B)

A liquid mixture of Flaked-graphite B was obtained in the same manner as described above. The liquid mixture of Flaked-graphite B contained 0.25 g of Flaked-graphite B.

Next, 200 g of water was added to the resultant liquid mixture of Flaked-graphite B, followed by addition of 500 g of o-dichlorobenzene, resulting in a mixed solution. The mixed solution was well stirred to extract flaked-graphite in an organic layer of the mixed solution. Thereafter, the mixed solution was allowed to stand to separate the mixed solution into a lower layer made of a black o-dichlorobenzene layer and an upper layer made of a clear, colorless aqueous solution layer. Subsequently, the lower layer made of an o-dichlorobenzene layer was recovered. Thereafter, 200 g of water was added to the extracted o-dichlorobenzene layer and stirred again in the same manner and the o-dichlorobenzene layer was then recovered to remove impurities from the o-dichlorobenzene layer. Thus obtained was 500 g of o-dichlorobenzene solution of Flaked-graphite B, which was made of the above o-dichlorobenzene layer. The resultant 500 g of o-dichlorobenzene solution of Flaked-graphite B contained 0.25 g of Flaked-graphite B.

An amount of 250 g of the o-dichlorobenzene solution of Flaked-graphite B obtained in the above manner was used in later-described Examples 4, 8 to 10, 12, 14, 15, 23, and 24 and Comparative Examples 4, 10 to 12, 14, 16, 17, 25, and 26. The 250 g of o-dichlorobenzene solution of Flaked-graphite B contained 0.125 g of Flaked-graphite B.

(Carbon Nanotube (CNT))

Multi-walled carbon nanotubes having a trade name "Nanocyl-3100" and manufactured by Nanocyl were used in Examples 5, 11, and 25 and Comparative Examples 5, 13, and 27.

The average length of the carbon nanotubes was about 1.5 μm and the average diameter thereof was about 9.5 nm.

(Synthetic Resin)

Synthetic resins used in the examples of the present invention and the comparative examples are as follows.

(1) Polypropylene resin (PP) . . . trade name "J-721GR" manufactured by Prime Polymer Co., Ltd., tensile elastic modulus at 23° C.: 1.2 GPa, linear expansion coefficient: $11 \times 10^{-5}$/K (2) High-density polyethylene resin (PE) . . . trade name "HF560" manufactured by Japan Polyethylene Corporation, tensile elastic modulus at 23° C.: 1.0 GPa (3) Silane-modified polypropylene resin (Silane-PP) . . . trade name "LINKLON XPM800HM" manufactured by Mitsubishi Chemical Corporation, tensile elastic modulus at 23° C.: 1.1 GPa, linear expansion coefficient: $14 \times 10^{-5}$/K (4) Polymethyl methacrylate resin (PMMA) . . . trade name "SUMIPEX ES" manufactured by Sumitomo Chemical Co., Ltd., bending elastic modulus at 23° C.: 2.9 GPa, linear expansion coefficient: $7 \times 10^{-5}$/K (5) Polyamide resin (PA) . . . trade name "A-125J" manufactured by Unitika Ltd., tensile elastic modulus at 23° C.: 1.0 GPa, linear expansion coefficient: $9 \times 10^{-5}$/K (6) Polyacrylonitrile resin (PAN) . . . trade name "Barex #1000" manufactured by Mitsui Chemicals, Inc., tensile elastic modulus at 23° C.: 3.3 GPa, linear expansion coefficient: $8 \times 10^{-5}$/K (7) Polystyrene resin (PSt) . . . trade name "TOYO STYROL GP RMS26" manufactured by TOYO STYRENE Co., Ltd., bending elastic modulus at 23° C.: 3.2 GPa (8) Polycarbonate resin (PC) . . . trade name "CALIBRE 301-15" manufactured by Sumika Styron Polycarbonate Limited, tensile elastic modulus at 23° C.: 2.3 GPa, linear expansion coefficient: $7 \times 10^{-5}$/K (9) Atactic polypropylene resin (aPP) . . . trade name "TAFTHREN T3712" manufactured by Sumitomo Chemical Co., Ltd., tensile elastic modulus at 23° C.: 40 MPa (Radical Initiator)

Benzoyl peroxide manufactured by Sigma-Aldrich Corporation was used as the radical initiator for use in later-described Examples 6 to 17.

Resin Composite Material Sheet Obtained by Production Method Using Electron Beam Irradiation Example 1

An amount of 100 parts by weight of polypropylene resin, 20 parts by weight of Flaked-graphite A, and 3 parts by weight of divinylbenzene as a reaction aid were fed into and kneaded by a Plastomill at 180° C. and then pressed to obtain a sheet-like form having a smooth surface and a thickness of 1 mm. The resultant sheet-like form was irradiated with 1.5 Mrad ionizing radiation at an accelerating voltage of 700 kV to obtain a resin composite material sheet having a smooth surface and a thickness of 1 mm.

Example 2

An amount of 100 parts by weight of high-density polyethylene resin and 20 parts by weight of Flaked-graphite A were fed into and kneaded by a Plastomill at 160° C. and then pressed to obtain a sheet-like form having a smooth surface and a thickness of 1 mm. The resultant sheet-like form was irradiated with 1.5 Mrad ionizing radiation at an accelerating voltage of 700 kV to obtain a resin composite material sheet having a smooth surface and a thickness of 1 mm.

Example 3

An amount of 100 parts by weight of polycarbonate resin and 20 parts by weight of Flaked-graphite A were fed into and kneaded by a Plastomill at 290° C. and then pressed to obtain a sheet-like form having a smooth surface and a thickness of 1 mm. The resultant sheet-like form was irradiated with 3.0 Mrad ionizing radiation at an accelerating voltage of 700 kV to obtain a resin composite material sheet having a smooth surface and a thickness of 1 mm.

Example 4

An amount of 2.5 g (100 parts by weight) of atactic polypropylene resin was added to 250 g of o-dichlorobenzene solution of Flaked-graphite B (containing 0.125 g (5 parts by weight) of flaked-graphite) heated to 130° C., followed by stirring at 130° C. for two hours to dissolve the atactic polypropylene resin in the solution, resulting in a mixed solution. The resultant mixed solution was let cool at room temperature, filtered, and subsequently dried in a vacuum.

Thereafter, the mixed solution was pressed at 180° C. to obtain a sheet-like form having a smooth surface and a thickness of 0.5 mm. PET release films were applied to both the surfaces of the resultant sheet-like form for the purpose of preventing shrinkage. Thereafter, the sheet-like form was irradiated with 1.5 Mrad ionizing radiation at an accelerating voltage of 700 kV to obtain a resin composite material sheet having a smooth surface and a thickness of 1 mm.

Example 5

An amount of 100 parts by weight of atactic polypropylene resin and 40 parts by weight of multi-walled carbon nanotubes were fed into and kneaded by a Plastomil at 180° C. and then pressed to obtain a sheet-like form having a smooth surface and a thickness of 1 mm. PET release films were applied to both the surfaces of the resultant sheet-like form for the purpose of preventing shrinkage. Thereafter, the sheet-like form was irradiated with 1.5 Mrad ionizing radiation at an accelerating voltage of 700 kV to obtain a resin composite material sheet having a smooth surface and a thickness of 1 mm.

Comparative Examples 1 to 5

Resin composite material sheets having a smooth surface and a thickness of 1 mm were obtained in the same manners as in respective Examples 1 to 5 except that they were not irradiated with ionizing radiation.

Comparative Example 6

A resin composite material sheet having a smooth surface and a thickness of 1 mm was obtained in the same manner as in Example 1 except for no addition of Flaked-graphite A.

In the sheet-like form before being irradiated with ionizing radiation, the tensile elastic modulus at 23° C. was 1.7 GPa.

Comparative Example 7

A resin composite material sheet having a smooth surface and a thickness of 1 mm was obtained in the same manner as in Example 5 except for no addition of multi-walled carbon nanotubes.

Resin Composite Material Sheet Obtained by Production Method Using Radical Initiator Example 6

An amount of 100 parts by weight of polypropylene resin, 20 parts by weight of Flaked-graphite A, and 6 parts by weight of benzoyl peroxide as a radical initiator were fed into and melt-kneaded by an extruder to obtain a polyolefin resin composite.

An amount of 120 parts by weight of the polyolefin resin composite and 100 parts by weight of fresh polypropylene resin were fed into and melt-kneaded at 190° C. by an extruder to obtain a melt-kneaded product. Thereafter, the melt-kneaded product was extruded through a T-die mounted at a front end of the extruder and sheet-formed by a cooling roll to obtain a resin composite material sheet having a smooth surface and a thickness of 0.5 mm.

Example 7

An amount of 100 parts by weight of polypropylene resin, 10 parts by weight of Flaked-graphite B, and 3 parts by weight of benzoyl peroxide as a radical initiator were fed into and kneaded by a Plastomill at 180° C. and then pressed to obtain a resin composite material sheet having a smooth surface and a thickness of 0.5 mm.

Example 8

An amount of 2.5 g (100 parts by weight) of polypropylene resin was added to 250 g of o-dichlorobenzene solution of Flaked-graphite B (containing 0.125 g (5 parts by weight) of flaked-graphite) heated to 130° C., followed by stirring at 130° C. for two hours to dissolve the polypropylene resin in the solution, resulting in a mixed solution. Next, 10 g of 0.1% by weight benzoyl peroxide-o-dichlorobenzene solution (containing 0.4 parts by weight of benzoyl peroxide) as a radical initiator was added dropwise to the above mixed solution in a nitrogen atmosphere. Subsequently, the resultant solution was continued to be stirred for two hours to obtain a graft reactant. Thereafter, the reactant was let cool at room temperature, filtered, and subsequently dried in a vacuum.

Thereafter, the vacuum-dried reactant was pressed at 180° C. to obtain a resin composite material sheet having a smooth surface and a thickness of 0.5 mm.

Example 9

A resin composite material sheet was obtained in the same manner as in Example 8 except for use of 10 g of 0.5% by weight benzoyl peroxide-o-dichlorobenzene solution (containing 2 parts by weight of benzoyl peroxide).

The resin composite material sheet was cut into small resin composite material pieces. Next, the resin composite material pieces were wrapped in a filter paper. The edges of the filter paper were interfolded to avoid the resin composite material pieces from leaking out of the paper and the peripheral portion thereof was then sealed by metal clips. The envelope thus obtained was immersed for 12 hours in an excessive amount of hot xylene heated at 130° C. Thus, an ungrafted portion of the polypropylene resin contained in the resin composite material sheet was dissolved away. Thereafter, the envelope was picked up from the solvent and dried in a vacuum to recover refined, resin-grafted flaked-graphite.

Thereafter, 100 parts by weight of polypropylene resin and 5 parts by weight of the resultant resin-grafted flaked-graphite were fed into and melt-kneaded by a Plastomill at 180° C. and then pressed at 180° C. to obtain a resin composite material sheet having a smooth surface and a thickness of 0.5 mm. The resin composite material sheet thus obtained was used as a resin composite material sheet of Example 9.

Example 10

A resin composite material sheet having a smooth surface and a thickness of 0.5 mm was obtained in the same manner as in Example 9 except that atactic polypropylene resin was used instead of the polypropylene resin added to the o-dichlorobenzene solution of Flaked-graphite B.

Example 11

A resin composite material sheet having a smooth surface and a thickness of 0.5 mm was obtained in the same manner as in Example 6 except that atactic polypropylene resin was used instead of the polypropylene resin initially used and 40 parts by weight of carbon nanotubes were used instead of 20 parts by weight of Flaked-graphite A.

Example 12

A resin composite material sheet having a smooth surface and a thickness of 0.5 mm was obtained in the same manner as in Example 8 except that 2.5 g (100 parts by weight) of high-density polyethylene resin was used instead of 2.5 g of polypropylene resin used for grafting and 10 g of 0.7% by weight benzoyl peroxide-o-dichlorobenzene solution (containing 2.8 parts by weight of benzoyl peroxide) was used.

Example 13

An amount of 100 parts by weight of silane-modified polypropylene resin, 3 parts by weight of Flaked-graphite A, and 4 parts by weight of benzoyl peroxide as a radical initiator were fed into and melt-kneaded at 190° C. by an extruder to obtain a melt-kneaded product. Thereafter, the melt-kneaded product was extruded through a T-die mounted at a front end of the extruder and sheet-formed by a cooling roll to obtain a resin composite material sheet having a smooth surface and a thickness of 0.5 mm.

Example 14

A resin composite material, sheet having a smooth surface and a thickness of 0.5 mm was obtained in the same manner as in Example 8 except that polymethyl methacrylate resin was used instead of polypropylene resin.

Example 15

A resin composite material sheet having a smooth surface and a thickness of 0.5 mm was obtained in the same manner as in Example 8 except that polystyrene resin was used instead of polypropylene resin.

Example 16

An amount of 100 parts by weight of polyamide resin, 3 parts by weight of Flaked-graphite A, and 6 parts by weight of benzoyl peroxide as a radical initiator were fed into and melt-kneaded at 270° C. by an extruder to obtain a melt-kneaded product. Thereafter, the melt-kneaded product was extruded through a T-die mounted at a front end of the extruder and sheet-formed by a cooling roll to obtain a resin composite material sheet having a smooth surface and a thickness of 0.5 mm.

Example 17

An amount of 100 parts by weight of polyacrylonitrile resin, 3 parts by weight of Flaked-graphite A, and 6 parts by weight of benzoyl peroxide as a radical initiator were fed into and melt-kneaded at 200° C. by an extruder to obtain a melt-kneaded product. Thereafter, the melt-kneaded product was extruded through a T-die mounted at a front end of the extruder and sheet-formed by a cooling roll to obtain a resin composite material sheet having a smooth surface and a thickness of 0.5 mm.

Comparative Examples 8 to 19

Resin composite material sheets having a thickness of 0.5 mm were obtained in the same manners as in respective Examples 6 to 17 except for no use of benzoyl peroxide.

Resin Composite Material Sheet Obtained by Production Method Using High-Shear Kneading Example 18

Using a unidirectional biaxial extruder (screw diameter: 15 mm, effective screw length/screw diameter: 120), 100 parts by weight of polypropylene resin and 20 parts by weight of Flaked-graphite A were melted by heating them at 200° C. to 250° C. and kneaded (screw rotational speed: 2500 rpm) to obtain a melt-kneaded product. Thereafter, the melt-kneaded product was extruded through a T-die mounted at a front end of the extruder and sheet-formed by a cooling roll to obtain a resin composite material sheet having a smooth surface and a thickness of 0.5 mm.

Example 19

Using a unidirectional biaxial extruder (screw diameter: 15 mm, effective screw length/screw diameter: 120), 100 parts by weight of high-density polyethylene resin and 20 parts by weight of Flaked-graphite A were melted by heating them at 200° C. to 280° C. and kneaded (screw rotational speed: 1000 rpm) to obtain a melt-kneaded product. Thereafter, the melt-kneaded product was extruded through a T-die mounted at a front end of the extruder and sheet-formed by a cooling roll to obtain a resin composite material sheet having a smooth surface and a thickness of 0.5 mm.

Example 20

Using a unidirectional biaxial extruder (screw diameter: 15 mm, effective screw length/screw diameter: 120), 100 parts by weight of polystyrene resin and 20 parts by weight of Flaked-graphite A were melted by heating them at 120° C. to 200° C. and kneaded (screw rotational speed: 4500 rpm) to obtain a melt-kneaded product. Thereafter, the melt-kneaded product was extruded through a T-die mounted at a front end of the extruder and sheet-formed by a cooling roll to obtain a resin composite material sheet having a smooth surface and a thickness of 0.5 mm.

Comparative Examples 20 to 22

Resin composite material sheets having a smooth surface and a thickness of 0.5 mm were obtained in the same manners as in respective Examples 18 to 20 except that the screw rotational speed was 200 rpm.

Resin Composite Material Sheet Obtained by Production Method Using Microwave Irradiation Example 21

An amount of 100 parts by weight of polypropylene resin and 20 parts by weight of Flaked-graphite A were fed into and kneaded by a Plastomill at 180° C. and then pressed to obtain a sheet-like form having a smooth surface and a thickness of 0.5 mm. The resultant sheet-like form was irradiated with microwaves for 60 seconds using a 300 W microwave oven. Subsequently, the sheet-like form was let cool to room temperature and irradiated again with microwaves for 60 seconds using the 300 W microwave oven. Thereafter, the sheet-like form was pressed at 180° C. to obtain a resin composite material sheet having a smooth surface and a thickness of 0.5 mm.

Example 22

An amount of 100 parts by weight of high-density polyethylene resin and 20 parts by weight of Flaked-graphite A were fed into and kneaded by a Plastomil at 180° C. and then pressed to obtain a sheet-like form having a smooth surface and a thickness of 0.5 mm. The resultant sheet-like form was irradiated with microwaves for 60 seconds using a 100 W microwave oven. Subsequently, the sheet-like form was let cool to room temperature and irradiated again with microwaves for 60 seconds using the 100 W microwave oven. Thereafter, the sheet-like form was pressed at 180° C. to obtain a resin composite material sheet having a smooth surface and a thickness of 0.5 mm.

Example 23

An amount of 2.5 g (100 parts by weight) of polystyrene resin was added to 250 g of o-dichlorobenzene solution of Flaked-graphite B (containing 0.125 g (5 parts by weight) of flaked-graphite) heated to 130° C., followed by stirring at 130° C. for two hours to dissolve the polystyrene resin in the solution, resulting in a mixed solution. The resultant mixed solution was let cool at room temperature, filtered, and subsequently dried in a vacuum.

Thereafter, the mixed solution was pressed at 160° C. to obtain a sheet-like form having a smooth surface and a thickness of 0.5 mm. The resultant sheet-like form was irradiated with microwaves for 30 seconds using a 500 W microwave oven. Subsequently, the sheet-like form was let cool to room temperature, followed by twice repetition of the above microwave irradiation and the above cooling. Thereafter, the sheet-like form was pressed at 160° C. to obtain a resin composite material sheet having a smooth surface and a thickness of 0.5 mm.

Example 24

A resin composite material sheet was obtained in the same manner as in Example 23. The resin composite material sheet was cut into small resin composite material pieces. Next, the resin composite material pieces were wrapped in a filter paper. The edges of the filter paper were interfolded to avoid the resin composite material pieces from leaking out of the paper and the peripheral portion thereof was then sealed by metal clips. The envelope thus obtained was immersed in an excessive amount of THF for 24 hours. Thus, an ungrafted portion of the polystyrene resin contained in the resin composite material sheet was dissolved away. Thereafter, the envelope was picked up from the solvent and dried in a vacuum to recover refined, resin-grafted flaked-graphite.

Thereafter, 100 parts by weight of polystyrene resin and 5 parts by weight of the resultant resin-grafted flaked-graphite were fed into and melt-kneaded by a Plastomill at 160° C. and then pressed to obtain a resin composite material sheet having a smooth surface and a thickness of 0.5 mm. The resin composite material sheet thus obtained was used as a resin composite material sheet of Example 24.

Example 25

A resin composite material sheet having a smooth surface and a thickness of 0.5 mm was obtained in the same manner as in Example 21 except that 40 parts by weight of multi-walled carbon nanotubes were used instead of 20 parts by weight of Flaked-Graphite A.

Comparative Examples 23 to 27

Resin composite material sheets having a smooth surface and a thickness of 0.5 mm were obtained in the same manners as in respective Examples 21 to 25 except that they were not irradiated with microwaves.

(Evaluation of Examples and Comparative Examples)

The resultant resin composite materials were measured in terms of grafting ratio, tensile elastic modulus, bending elastic modulus, linear expansion coefficient, and Raman spectrum in the following manners.

(1) Grafting Ratio Measurement

Each of the resin composite material sheets obtained in Examples and Comparative Examples was cut into small resin composite material pieces. Next, the resin composite material pieces were wrapped in a filter paper. The edges of the filter paper were interfolded to avoid the resin composite material pieces from leaking out of the paper and the peripheral portion thereof was then sealed by metal clips. The envelope thus obtained was immersed into an excessive amount of solvent for 12 hours. Thus, an ungrafted portion of the synthetic resin contained in the resin composite material sheet was dissolved away.

The solvent used was hot xylene at 130° C. if the synthetic resin used was a polypropylene resin, a high-density polyethylene resin, a silane-modified polypropylene resin or an atactic polypropylene resin. If the synthetic resin used was a polymethyl methacrylate resin, dichlorobenzene was used as the solvent. If the synthetic resin used was a polyamide resin, hot nitrobenzene at 200° C. was used as the solvent. If the synthetic resin used was a polystyrene resin, dichlorobenzene was used as the solvent. If the synthetic resin used was a polycarbonate resin, THF was used as the solvent.

Thereafter, the envelope was picked up from the solvent and dried in a vacuum to isolate the resin-grafted flaked-graphite.

The resin-grafted flaked-graphite thus isolated was subjected to a thermogravimetric measurement (TGA measurement) within the temperature range of 30° C. to 600° C. at a rate of temperature increase of 10° C./min in an air atmosphere. Then, supposing that the amount of matter of the resin-grafted flaked-graphite decomposed before the temperature was increased to 500° C. was represented as A % by weight and the amount of undecomposed residue thereof not yet decomposed even when the temperature was increased to 500° C. was represented as B % by weight, the grafting ratio was determined from the following equation. The results are shown in Tables 1 to 5 below.

Grafting ratio (% by weight)=$A/B$×100

(2) Tensile Elastic Modulus Measurement

Each of the resin composite material sheets obtained in Examples and Comparative Examples was measured in terms of tensile elastic modulus at 23° C. in conformity with JIS K6767. The results are shown in Tables 1 to 5 below.

(3) Bending Elastic Modulus Measurement

Each of the resin composite material sheets obtained in Examples and Comparative Examples was measured in terms of apparent bending elastic modulus at 23° C. in conformity with JIS K7161. The results are shown in Tables 1 to 5 below.

(4) Linear Expansion Coefficient Measurement

Each of the resin composite material sheets obtained in Examples and Comparative Examples was measured in terms of linear expansion coefficient at 30° C. to 100° C. in conformity with JIS K7197. The results are shown in Tables 1 to 5 below.

TABLE 1

| | | | | Ex. 1 | Ex. 2 | Ex. 3 | Ex. 4 | Ex. 5 | Comp. Ex. 1 | Comp. Ex. 2 |
|---|---|---|---|---|---|---|---|---|---|---|
| Synthetic Resin | PP | J-721GR | (parts by weight) | 100 | | | | | 100 | |
| | PE | HF560 | | | 100 | | | | | 100 |
| | PC | CALIBRE 301-15 | | | | 100 | | | | |
| | aPP | TAFTHREN T3712 | | | | | 100 | 100 | | |
| Carbon Material | Flaked Graphite | Flaked Graphite A | (parts by weight) | 20 | 20 | 20 | | | 20 | 20 |
| | | Flaked Graphite B | | | | | 5 | | | |
| | CNT | Nanocyl-3100 | | | | | | 40 | | |
| Additive | Reaction Aid | divinylbenzene | (parts by weight) | 3 | | | | | 3 | |
| Grafting Treatment | Ionizing Radiation | | (Mrad) | 1.5 | 1.5 | 3.0 | 1.5 | 1.5 | | |
| Physical Properties | Grafting Ratio | | (wt %) | 278 | 412 | 13 | 194 | 112 | below 5 | below 5 |
| | Tensile Elastic Modulus | | (GPa) | 5.2 | 5.0 | 5.1 | | | 3.5 | 2.6 |
| | Bending Elastic Modulus | | (GPa) | | | | | | | |
| | Linear Expansion Coefficient | | (×10$^{-5}$/K) | 8.6 | | 5.8 | | | 10.1 | |

| | | | | Comp. Ex. 3 | Comp. Ex. 4 | Comp. Ex. 5 | Comp. Ex. 8 | Comp. Ex. 7 |
|---|---|---|---|---|---|---|---|---|
| Synthetic Resin | PP | J-721GR | (parts by weight) | | | | 100 | |
| | PE | HF560 | | | | | | |
| | PC | CALIBRE 301-15 | | | 100 | | | |
| | aPP | TAFTHREN T3712 | | 100 | | 100 | | 100 |
| Carbon Material | Flaked Graphite | Flaked Graphite A | (parts by weight) | 20 | | | | |
| | | Flaked Graphite B | | | 5 | | | |
| | CNT | Nanocyl-3100 | | | | 40 | | |
| Additive | Reaction Aid | divinylbenzene | (parts by weight) | | | | 3 | |
| Grafting Treatment | Ionizing Radiation | | (Mrad) | | | | 1.5 | 1.5 |
| Physical Properties | Grafting Ratio | | (wt %) | below 5 | below 5 | below 5 | below 5 | below 5 |
| | Tensile Elastic Modulus | | (GPa) | 4.1 | | | 1.7 | |
| | Bending Elastic Modulus | | (GPa) | | | | | |
| | Linear Expansion Coefficient | | (×10$^{-5}$/K) | 6.4 | | | 11.4 | |

TABLE 2

| | | | | Ex. 6 | Ex. 7 | Ex. 8 | Ex. 9 | Ex. 10 | Ex. 11 | Ex. 12 |
|---|---|---|---|---|---|---|---|---|---|---|
| Synthetic Resin | PP | J-721GR | (parts by weight) | 100 | 100 | 100 | 100 | | | |
| | PE | HF560 | | | | | | | | 100 |
| | Silane-PP | LINKLON XPM800HM | | | | | | | | |
| | PMMA | SUMIPEX ES | | | | | | | | |
| | PA | A-125J | | | | | | | | |
| | PAN | Barex #1000 | | | | | | | | |
| | PSt | TOYO STYROL GP RMS26 | | | | | | | | |
| | aPP | TAFTHREN T3712 | | | | | | 100 | 100 | |
| Carbon Material | Flaked Graphite | Flaked Graphite A | (parts by weight) | 20 | | | | | | |
| | | Flaked Graphite B | | | 10 | 5 | 5 | 5 | | 5 |
| | CNT | Nanocyl-3100 | | | | | | | 40 | |

TABLE 2-continued

| | | | | | | | | | | |
|---|---|---|---|---|---|---|---|---|---|---|
| Grafting Treatment | Radical Initiator | benzoyl peroxide | (parts by weight) | 6 | 3 | 0.4 | 2 | 2 | 6 | 2.8 |
| Additional Resin | PP | J-721GR | (parts by weight) | 100 | | | | | 100 | |
| Refining Treatment | With or Without Refining of Resin-Grafted Flaked Graphite | | | | | | ○ | ○ | | |
| | Resin | PP | J-721GR | (parts by weight) | | | | 100 | 100 | | |
| | Carbon Material | Flaked Graphite | Resin-Grafted Flaked Graphite | (parts by weight) | | | | 5 | 5 | | |
| Physical Properties | Grafting Ratio | | (wt %) | 84 | 241 | 203 | 417 | 509 | 187 | 1810 |
| | Tensile Elastic Modulus | | (GPa) | 4.7 | 5.9 | 4.9 | 5.3 | 4.0 | 2.6 | 4.4 |
| | Sending Elastic Modulus | | (GPa) | | | | | | | |
| | Linear Expansion Coefficient | | (×10⁻⁵/K) | 8.8 | | 8.1 | 7.7 | 7.3 | 6.4 | |

| | | | | Ex. 13 | Ex. 14 | Ex. 15 | Ex. 16 | Ex. 17 |
|---|---|---|---|---|---|---|---|---|
| Synthetic Resin | PP | J-721GR | (parts by weight) | | | | | |
| | PE | HF560 | | | | | | |
| | Silane-PP | LINKLON XPM800HM | | 100 | | | | |
| | PMMA | SUMIPEX ES | | | 100 | | | |
| | PA | A-125J | | | | | 100 | |
| | PAN | Barex #1000 | | | | | | 100 |
| | PSt | TOYO STYROL GP RMS26 | | | | 100 | | |
| | aPP | TAFTHREN T3712 | | | | | | |
| Carbon Material | Flaked Graphite | Flaked Graphite A | (parts by weight) | 3 | | | 3 | 3 |
| | | Flaked Graphite B | | | 5 | 5 | | |
| | CNT | Nanocyl-3100 | | | | | | |
| Grafting Treatment | Radical Initiator | benzoyl peroxide | (parts by weight) | 4 | 0.4 | 0.4 | 6 | 6 |
| Additional Resin | PP | J-721GR | (parts by weight) | | | | | |
| Refining Treatment | With or Without Refining of Resin-Grafted Flaked Graphite | | | | | | | |
| | Resin | PP | J-721GR | (parts by weight) | | | | | |
| | Carbon Material | Flaked Graphite | Resin-Grafted Flaked Graphite | (parts by weight) | | | | | |
| Physical Properties | Grafting Ratio | | (wt %) | 3081 | 274 | 317 | 74 | 114 |
| | Tensile Elastic Modulus | | (GPa) | | 3.1 | | 2.4 | 4.9 |
| | Sending Elastic Modulus | | (GPa) | | | 4.7 | 5.9 | |
| | Linear Expansion Coefficient | | (×10⁻⁵/K) | 9.5 | 5.7 | | 7.5 | 7.1 |

TABLE 3

| | | | | Comp. Ex. 8 | Comp. Ex. 9 | Comp. Ex. 10 | Comp. Ex. 11 | Comp. Ex. 12 | Comp. Ex. 13 | Comp. Ex. 14 |
|---|---|---|---|---|---|---|---|---|---|---|
| Synthetic Resin | PP | J-721GR | (parts by weight) | 100 | 100 | 100 | 100 | | | |
| | PE | HF560 | | | | | | | | 100 |
| | Silane-PP | LINKLON XPM800HM | | | | | | | | |
| | PMMA | SUMIPEX ES | | | | | | | | |
| | PA | A-125J | | | | | | | | |
| | PAN | Barex #1000 | | | | | | | | |
| | PSt | TOYO STYROL GP RMS26 | | | | | | | | |
| | aPP | TAFTHREN T3712 | | | | | | 100 | 100 | |
| Carbon Material | Flaked Graphite | Flaked Graphite A | (parts by weight) | 20 | | | | | | |
| | | Flaked Graphite B | | | 10 | 5 | 5 | 5 | | 5 |
| | CNT | Nanocyl-3100 | | | | | | | 40 | |
| Grafting Treatment | Radical Initiator | benzoyl peroxide | (parts by weight) | | | | | | | |
| Additional Resin | PP | J-721GR | (parts by weight) | 100 | | | | | 100 | |
| Refining Treatment | With or Without Refining of Resin-Grafted Flaked Graphite | | | | | | ○ | ○ | | |
| | Resin | PP | J-721GR | (parts by weight) | | | | 100 | 100 | | |
| | Carbon Material | Flaked Graphite | Resin-Grafted Flaked Graphite | (parts by weight) | | | | 5 | 5 | | |
| Physical Properties | Grafting Ratio | | (wt %) | below 5 | below 5 | below 5 | below 5 | below 5 | below 5 | below 5 |
| | Tensile Elastic Modulus | | (GPa) | 2.3 | 2.7 | 1.8 | 1.8 | | 1.5 | 1.6 |
| | Bending Elastic Modulus | | (GPa) | | | | | | | |
| | Linear Expansion Coefficient | | (×10⁻⁵/K) | 10.1 | | 10.3 | 10.2 | 10.5 | 9.7 | |

TABLE 3-continued

|  |  |  |  | Comp. Ex. 15 | Comp. Ex. 16 | Comp. Ex. 17 | Comp. Ex. 18 | Comp Ex. 19 |
|---|---|---|---|---|---|---|---|---|
| Synthetic Resin | PP | J-721GR | (parts by weight) |  |  |  |  |  |
|  | PE | HF560 |  |  |  |  |  |  |
|  | Silane-PP | LINKLON XPM800HM |  | 100 |  |  |  |  |
|  | PMMA | SUMIPEX ES |  |  | 100 |  |  |  |
|  | PA | A-125J |  |  |  |  | 100 |  |
|  | PAN | Barex #1000 |  |  |  |  |  | 100 |
|  | PSt | TOYO STYROL GP RMS26 |  |  |  | 100 |  |  |
|  | aPP | TAFTHREN T3712 |  |  |  |  |  |  |
| Carbon Material | Flaked Graphite | Flaked Graphite A | (parts by weight) | 3 |  |  | 3 | 3 |
|  |  | Flaked Graphite B |  |  | 5 | 5 |  |  |
|  | CNT | Nanocyl-3100 |  |  |  |  |  |  |
| Grafting Treatment | Radical Initiator | benzoyl peroxide | (parts by weight) |  |  |  |  |  |
| Additional Resin | PP | J-721GR | (parts by weight) |  |  |  |  |  |
| Refining Treatment |  | With or Without Refining of Resin-Grafted Flaked Graphite |  |  |  |  |  |  |
|  | Resin | PP | J-721GR | (parts by weight) |  |  |  |  |  |
|  | Carbon Material | Flaked Graphite | Resin-Grafted Flaked Graphite | (parts by weight) |  |  |  |  |  |
| Physical Properties |  | Grafting Ratio | (wt %) | below 5 | below 5 | Below 5 | below 5 | below 5 |
|  |  | Tensile Elastic Modulus | (GPa) | 1.3 |  |  | 1.3 | 3.6 |
|  |  | Bending Elastic Modulus | (GPa) |  | 3.2 | 4.0 |  |  |
|  |  | Linear Expansion Coefficient | (×10$^{-5}$/K) | 13.2 | 6.8 |  | 8.5 | 7.9 |

TABLE 4

|  |  |  |  | Ex. 18 | Ex. 19 | Ex. 20 | Comp. Ex. 20 | Comp. Ex. 21 | Comp. Ex. 22 |
|---|---|---|---|---|---|---|---|---|---|
| Synthetic Resin | PP | J-721GR | (parts by weight) | 100 |  |  | 100 |  |  |
|  | PE | HF560 |  |  | 100 |  |  | 100 |  |
|  | PSt |  |  |  |  | 100 |  |  | 100 |
| Carbon Material | Flaked Graphite | Flaked Graphite A | (parts by weight) | 20 | 20 | 20 | 20 | 20 | 20 |
|  |  | Flaked Graphite B |  |  |  |  |  |  |  |
|  | CNT | Nanocyl-3100 |  |  |  |  |  |  |  |
| Grafting Treatment | Shearing Speed |  | (rpm) | 2500 | 1000 | 4500 | 200 | 200 | 200 |
| Physical Properties | Grafting Ratio |  | (wt %) | 93 | 114 | 178 | below 5 | below 5 | below 5 |
|  | Tensile Elastic Modulus |  | (GPa) | 5.1 | 3.9 |  | 2.3 | 2.6 |  |
|  | Bending Elastic Modulus |  | (GPa) |  |  | 5.4 |  |  | 4.1 |
|  | Linear Expansion Coefficient |  | (×10$^{-5}$/K) | 7.8 |  | 9.8 |  |  |  |

TABLE 5

|  |  |  |  | Ex. 21 | Ex. 22 | Ex. 23 | Ex. 24 | Ex. 25 | Comp. Ex. 23 |
|---|---|---|---|---|---|---|---|---|---|
| Synthetic Resin | PP | J-721GR | (parts by weight) | 100 |  |  |  | 100 | 100 |
|  | PE | HF560 |  |  | 100 |  |  |  |  |
|  | PSt | TOYO STYROL GP RMS26 |  |  |  | 100 | 100 |  |  |
| Carbon Material | Flaked Graphite | Flaked Graphite A | (parts by weight) | 20 | 20 |  |  |  | 20 |
|  |  | Flaked Graphite 8 |  |  |  | 5 | 5 |  |  |
|  | CNT | Nanocyl-3100 |  |  |  |  |  | 40 |  |
| Grafting Treatment | Microwave | (irradiation Power)/ (irradiation Time) | (W/sec) | 300/60 | 100/60 | 500/30 | 500/30 | 300/60 |  |
|  |  | Number of Irradiation Times | (times) | 2 | 2 | 3 | 3 | 2 |  |
| Refining Treatment |  | With or Without Refining of Resin-Grafted Flaked Graphite |  |  |  |  | ○ |  |  |
|  | Resin | PSt | TOYO STYROL GP RMS26 | (parts by weight) |  |  |  | 100 |  |  |
|  | Carbon Material | Flaked Graphite | Resin-Grafted Flaked Graphite | (parts by weight) |  |  |  | 5 |  |  |
| Physical Properties | Grafting Ratio |  | (wt %) | 99 | 121 | 312 | 312 | 78 | below 5 |
|  | Tensile Elastic Modulus |  | (GPa) | 4.7 | 4.7 |  |  | 1.9 | 2.3 |
|  | Bending Elastic Modulus |  | (GPa) |  |  | 5.1 | 6.0 |  |  |

TABLE 5-continued

| | | | | Comp. Ex. 24 | Comp. Ex. 25 | Comp. Ex. 26 | Comp. Ex. 27 |
|---|---|---|---|---|---|---|---|
| | | | Linear Expansion Coefficient (×10⁻⁵/K) | 8.7 | | 6.0 | 10.1 |
| Synthetic Resin | | PP | J-721GR | (parts by weight) | | | 100 |
| | | PE | HF560 | | 100 | | | |
| | | PSt | TOYO STYROL GP RMS26 | | | 100 | 100 | |
| Carbon Material | | Flaked Graphite | Flaked Graphite A | (parts by weight) | 20 | | | |
| | | | Flaked Graphite 8 | | | 5 | 5 | |
| | | CNT | Nanocyl-3100 | | | | | 40 |
| Grafting Treatment | | Microwave | (irradiation Power)/ (irradiation Time) | (W/sec) | | | | |
| | | | Number of Irradiation Times | (times) | | | | |
| Refining Treatment | | With or Without Refining of Resin-Grafted Flaked Graphite | | | | | ○ | |
| | Resin | PSt | TOYO STYROL GP RMS26 | (parts by weight) | | | 100 | |
| | Carbon Material | Flaked Graphite | Resin-Grafted Flaked Graphite | (parts by weight) | | | 5 | |
| Physical Properties | | Grafting Ratio | | (wt %) | below 5 | below 5 | below 5 | below 5 |
| | | Tensile Elastic Modulus | | (GPa) | 2.6 | | | 1.6 |
| | | Bending Elastic Modulus | | (GPa) | | 4.0 | 4.0 | |
| | | Linear Expansion Coefficient | | (×10⁻⁵/K) | | | | 8.9 |

As is evident from Tables 1 to 5, in the resin composite material sheets of Examples, a synthetic resin is grafted onto a carbon material, such as flaked-graphite or carbon nanotubes and the grafting ratio is within the range of 5% to 3300% by weight. Furthermore, the resin composite material sheets of Examples, as compared with those of the corresponding Comparative Examples, are significantly increased in tensile elastic modulus and/or bending elastic modulus and significantly decreased in linear expansion coefficient. The reason for this can be that since the synthetic resin was grafted onto the carbon material, the adhesion at the interface between the resin and the flaked-graphite was increased.

(5) Viscoelasticity Measurement

The resin composite material sheets obtained in Examples 4 and 5 and Comparative Examples 4, 5, and 7 were measured in terms of viscoelasticity in the following manner.

Using a dynamic viscoelasticity measuring instrument ("Ares" manufactured by TA Instruments), an amount of distortion of 1.0% was repeatedly applied to each of the obtained resin composite material sheets under the condition of a frequency of 10 rad/sec while increasing the temperature from 30° C. to 130° C. at a rate of temperature increase of 5° C./min. The storage elastic modulus E' and loss elastic modulus E" of each resin composite material during the application of distortion were measured. The results are shown in FIGS. 1 and 2.

As in evident from FIG. 1, the resin composite material sheet obtained in Example 4 is increased in storage elastic modulus (E') at high temperatures as compared with the resin composite material sheet obtained in Comparative Example 4. In addition, the resin composite material sheet obtained in Example 4 has no region in which the storage elastic modulus (E') falls below the loss elastic modulus (E"). This can be because in the resin composite material sheet obtained in Example 4, radicals of the atactic polypropylene resin were grafted onto Flaked-graphite B, so that the flow region of the resin disappeared from the resin composite material sheet.

Likewise, as is evident from FIG. 2, the resin composite material sheet obtained in Example 5 is increased in storage elastic modulus (E') as compared with the resin composite material sheet obtained in Comparative Example 5 and has no region in which the storage elastic modulus (E') falls below the loss elastic modulus (E"). This can be because, likewise, radicals of the atactic polypropylene resin were grafted onto multi-walled carbon nanotubes.

Furthermore, as seen from FIGS. 1 and 2, the resin composite material sheet obtained in Comparative Example 7 is significantly decreased in storage elastic modulus (E') and loss elastic modulus (E") as compared with the resin composite material sheets obtained in Comparative Examples 4 and 5. This can be because free radicals generated by peroxide or ionizing radiation degraded the atactic polypropylene resin. In contrast, the resin composite material sheets obtained in Examples 4 and 5 exhibit high storage elastic moduli (E') and high loss elastic moduli (E") in spite of the occurrence of resin degradation similar to the above. This can be because the effect of increasing the storage elastic modulus (E') and the loss elastic modulus (E") owing to grafting of radicals onto Flaked-graphite B and multi-wailed carbon nanotubes surpassed the decrease in storage elastic modulus (E') and loss elastic modulus (E") due to resin degradation.

(6) Raman Spectrum Measurement

Using a laser with a wavelength of 532 nm, the respective Raman spectra of the resin composite material sheets obtained in Example 6 and Comparative Example 8 were measured by Raman microscopy under the conditions of an exposure time of one second and 32 scan times. The results are shown in FIG. 3.

The peaks of the Raman spectra in the vicinity of 1583 $cm^{-1}$ are derived from the graphene structures of the carbon materials, while the peaks thereof in the vicinity of 1340 $cm^{-1}$ are derived from disturbances of the graphene structures due to the grafting reaction and so on. A peak drop in the vicinity of 1583 $cm^{-1}$ and a peak rise in the vicinity of 1340 $cm^{-1}$ both seen in the Raman spectrum of the resin composite material sheet of Example 6 can be considered to suggest that a fresh chemical bond was introduced into Flaked-graphite A.

The invention claimed is:

1. A resin composite material containing a synthetic resin and a carbon material with a graphene structure, the carbon material being dispersed in the synthetic resin, wherein the synthetic resin is grafted onto the carbon material and the grafting ratio thereof onto the carbon material is 30% to 3300% by weight,
   wherein the carbon material with the graphene structure is flaked-graphite, and
   wherein a number of layers of graphene sheets stacked in the flaked-graphite is 6 layers to 200 layers.

2. The resin composite material according to claim 1, further containing a resin of a different type from the synthetic resin.

3. The resin composite material according to claim 1 or 2, wherein the synthetic resin is a thermoplastic resin.

4. The resin composite material according to claim 3, wherein the thermoplastic resin is a polyolefin.

5. The resin composite material according to claim 3, wherein the thermoplastic resin is an amorphous resin.

6. The resin composite material according to claim 1, wherein the grafting ratio of the synthetic resin onto the carbon material is 30% to 2000% by weight.

7. The resin composite material according to claim 2, wherein
   the carbon material is present in an amount of 1 to 50 parts by weight relative to 100 parts by weight of the synthetic resin, and
   the resin of a different type from the synthetic resin is present in an amount of 100 to 1000 parts by weight relative to 100 parts by weight of the synthetic resin.

8. The resin composite material according to claim 2, wherein the resin of a different type from the synthetic resin is not grafted onto the carbon material.

* * * * *